Figure 1:
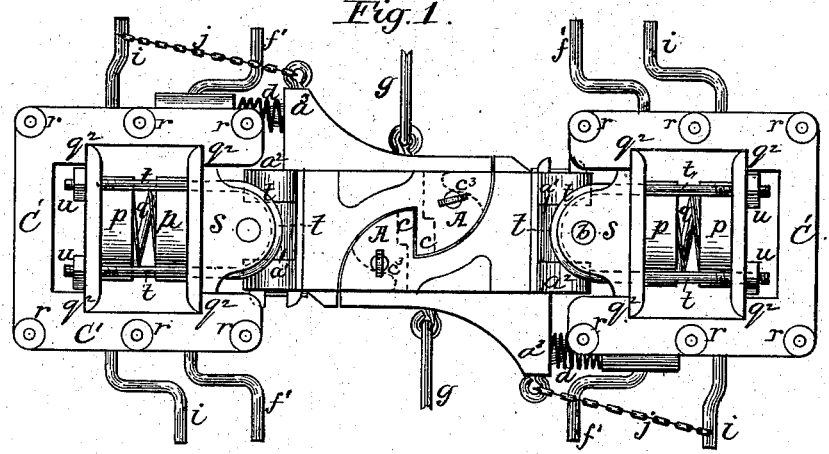

(No Model.) 3 Sheets—Sheet 1.

W. H. WARD.
CAR COUPLING.

No. 295,697. Patented Mar. 25, 1884.

Witnesses:
Edmund Brodhag
J. C. Hustemann

Inventor:
W. H. Ward
by Johnson & W. Johnson
Attys (No Model.) 3 Sheets—Sheet 2.
W. H. WARD.
CAR COUPLING.
No. 295,697. Patented Mar. 25, 1884.
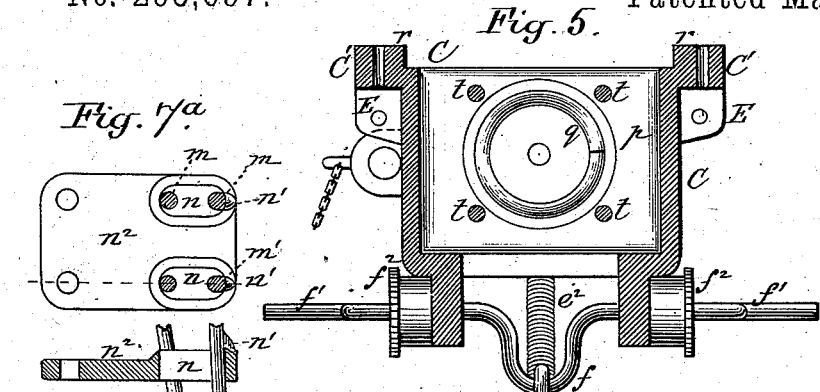
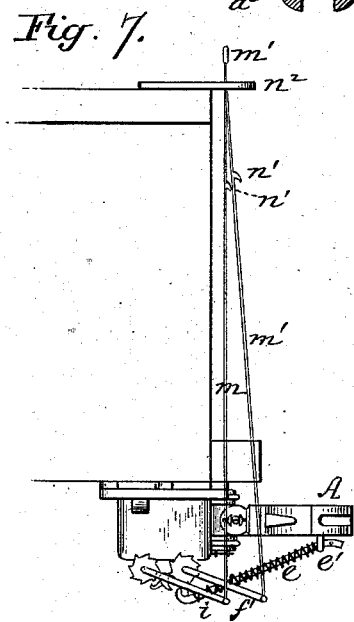
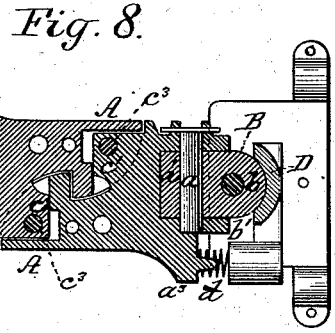
Witnesses:
Edmond Broakag
J. A. Santemann
Inventor:
W. H. Ward,
by Johnson & Johnson
Attys (No Model.)  3 Sheets—Sheet 3.
W. H. WARD.
CAR COUPLING.
No. 295,697. Patented Mar. 25, 1884.
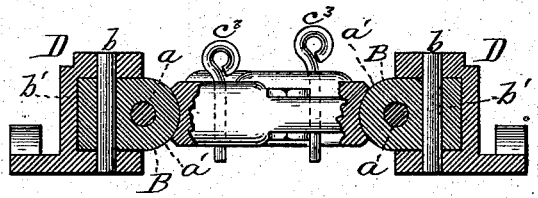
Fig. 9.
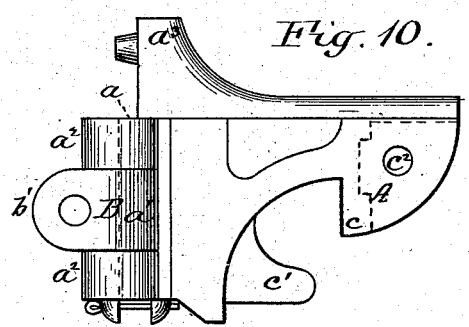
Fig. 10.
Fig. 11.
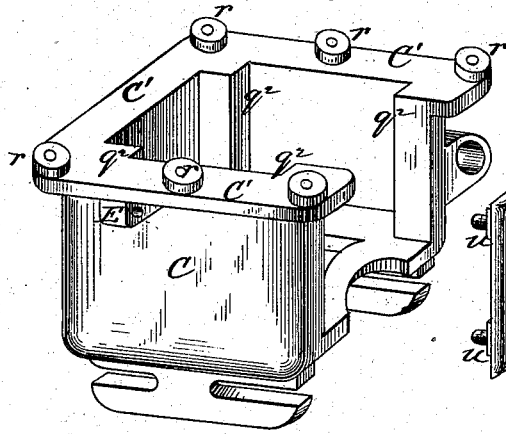
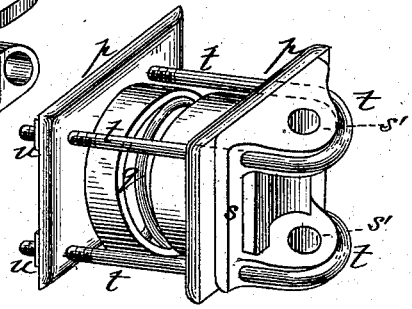
Fig. 12.
Fig. 13.
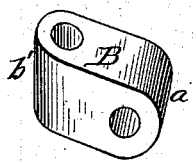
Witnesses:
Edmond Brodhag
J. H. Huntemann
Inventor:
W. H. Ward
by Johnson and Johnson
Attys.
N. PETERS, Photo-Lithographer, Washington, D. C.

UNITED STATES PATENT OFFICE.

WILLIAM H. WARD, OF MONONGAHELA CITY, PENNSYLVANIA.

CAR-COUPLING.

SPECIFICATION forming part of Letters Patent No. 295,697, dated March 25, 1884.

Application filed February 14, 1883. Renewed October 3, 1883. (No model.)

*To all whom it may concern:*

Be it known that I, WILLIAM HENRY WARD, a citizen of the United States, residing at Monongahela City, in the county of Washington and State of Pennsylvania, have invented new and useful Improvements in Car-Couplings, of which the following is a specification.

My invention relates to improvements in couplings for railway-cars, which are adapted to operate by hooking one with the other, the hook of each coupling having its pivotal point in the shank and the hook rigidly formed at the point of the shank, as contradistinguished from a pivoted hook-nose coupling carried by a fixed draw-head. The specific matters of my improvement will be hereinafter fully described, preparatory to a designation of the devices and combinations of parts claimed as the invention. The hooks are of like construction, each pivoted by a double-joint coupling, so as to have both lateral and vertical movements when connected, and thereby relieve the platform and the wheels of strain due to the unevenness of the road-bed and curves of the track, and lessen the wear of the rails and car-wheel flanges, and also lessening the retarding force in moving over or around the curves. Provision is made for locking the twin hooks to prevent accidental uncoupling by the movements of the cars. This improved coupling is adapted for use with passenger and freight cars, and is constructed for being coupled and uncoupled from either side of the car or from the top, and can be adjusted in position horizontally for coupling from either side of the car. It can be used with the ordinary coupling link and pin. The provision for locking the couplings is of great importance for through trains on uneven grades. The coupling-hook is adjusted and maintained in position for coupling by an elevating-rod provided with a coil-spring upon which the hook end rests, while a spring exerting a lateral force maintains the hook end in position to strike upon their curved ends and interlock as the cars come together.

Figure 2:
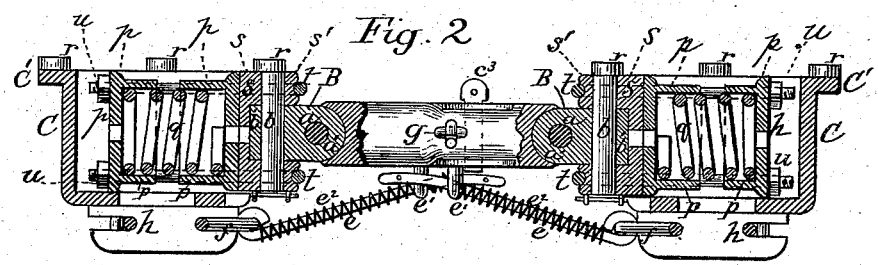
Figure 3:
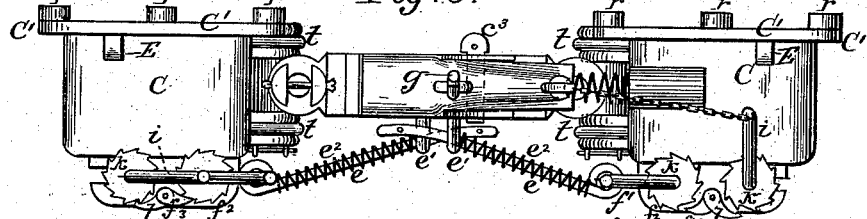
Figure 4:
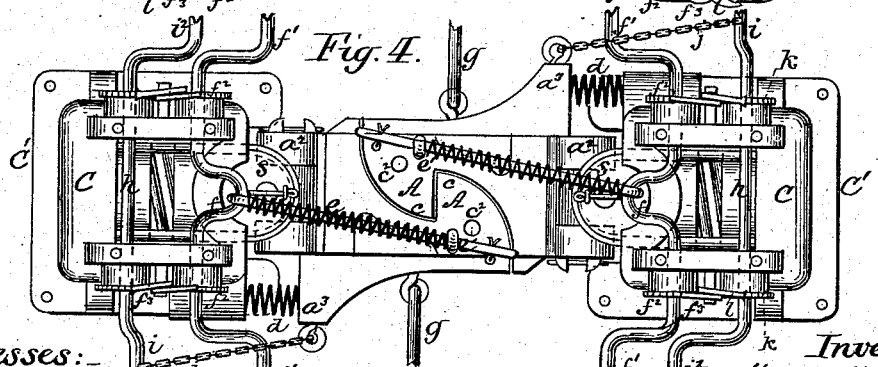

Referring to the accompanying drawings, Figure 1 represents a top view of a car-coupling constructed in accordance with my invention, the coupling-hooks being shown in coupled position; Fig. 2, a vertical longitudinal section; Fig. 3, a side elevation, and Fig. 4 a bottom view of the same; Fig. 5, a cross-section through the cushioned housing of the coupling; Fig. 6, a horizontal section, showing the hooks coupled and locked; Fig. 7, a side view of this self-coupler as applied to a freight-car; Fig. 7$^a$, the slotted top plate, $n^2$; and Fig. 7$^b$, a sectional view of the same, showing the hooked operating-rods used in freight-cars. Fig. 8 shows my improved coupling as applied to a non-cushioned draw-head; Fig. 9, a vertical longitudinal section of the same. Fig. 10 is a top view of the coupling-hook and its double-joint coupling. Fig. 11 is a perspective of the draw-head housing; Fig. 12, a similar view of the cushioned draw-head; and Fig. 13 shows the joint-coupling for the joint-pins.

The hook A is attached to the draw-head, housing, or other part by a double joint—that is to say, by a joint-coupling adapted to fit and form a horizontal butt-joint in the shank end of the hook and a vertical butt-joint in a fixed or cushioned part of the draw-head, whereby the car can sway laterally at each end and rise and fall vertically at each end upon the coupling-joints. This double joint gives an easy accommodating action of the car upon its end sills and coupling, so that the hooks, when coupled, have a sort of universal movement at their draw-head connection upon joint-pins arranged at right angles to each other. The joint-pin $a$ passes horizontally through knuckle-lugs $a^2$ of the hook-shank, and through the front projecting joint part, $a'$, of the joint-coupling B while the joint-pin $b$ passes vertically through the rear joint part, $b'$, of the joint-coupling B and connects it with the cushioned or fixed part of the draw-head. These joint-pins are pieces of rod-iron cut the required length, and secured by what is known as a "cross-cotter-pin fastening." The hook ends are rounded, so that in striking upon each other as the cars come together they turn outward upon their vertical pin-joints $b$ until their hooks $c$ pass each other and come automatically together by inward movements in interlocked positions, the hook part of one fitting into the throat of the other. These latter movements are effected by springs $d$, attached to some fixed part of the draw-head housing and pressing against a projection, $a^3$, on the side of each hook. The hooks are adjusted and maintained in horizontal relation with each other for coupling by an elevating-rod, $e$, attached to a crank, $f$, arranged in suitable bearings below the joint-coupling, B, said rod extending upward in a curved form, and passing through an eye, $e'$, in the under side of the hook. A spring, $e^2$, coiled upon this rod bears against the eye $e'$ and sustains the hook in an accommodating position. The hook is raised or lowered upon the spring by turning the crank $f$, so as to push the rod $e$ up or to draw it down. The elevating-rod is operated by a crank-handle, $f'$, extending at each side of the car within reach of the train-man, and is provided with a ratchet, $f^2$, for a pawl, $f^3$, so that when the hook is adjusted horizontally the crank $f$ is held by the ratchet and pawl, and the spring $e^2$ supports the hook accommodatingly at its eye-connection. The provision of a crank and pawl for the holding device for the hook-elevating rod at each side of the car gives the advantage of setting the hook of each car up or down from either side in making up the train, so that the hook of each car will be in horizontal line for coupling.

The shank of the coupling-hook is wide enough to extend sidewise beyond the hook part $c$ proper to form a wide throat in the hook-neck, and a projection, $c'$, Fig. 10, extends from the shank part into the throat-space, but not closing it, so as to stand within line of the coupling-hook when the hooks are coupled. The hook-heads are formed with interior recesses, $c^4$, which open at their curved ends, so as to receive the projections $c'$ when coupling, and they are also formed with pin-holes $c^2$, into which pins $c^3$ can be inserted across the inner sides of the said projections $c'$, as in Fig. 6, so as to lock the hooks together, it being practically impossible to separate them so long as the locking-pins remain in position. This locking provision for the hooks is independent of the uncoupling devices and gives absolute coupling security for through trains. The projection $c'$ of one hook fits into the slotted head of the other hook, and thereby serves to prevent vertical movements of the hook-heads upon each other. The recesses $c^4$ of the hook-heads and the pin-holes $c^2$ adapt the coupling for use with the ordinary link, the pins for locking the hooks serving in such change to couple with the link, so that cars fitted with the ordinary link-and-pin couplings can be used with cars provided with these twin couplings. The locking-pins may pass through holes in the projections $c'$, as shown in Fig. 8. For passenger-cars, the hooks are uncoupled from the platform by levers having rod or chain connection $g$, in the usual manner, so as to pull the hooks apart, as shown in Fig. 1. For freight-cars, the hooks are uncoupled from the top or from the ground by means which will now be described. A rod, $h$, bent to form a crank, $i$, at each end, is secured to the under side of the draw-head housing or to some fixed part, with the cranks at each side of the car. A chain, $j$, connects one of these cranks $i$ with the hook, so that by turning the crank $i^2$ upward the hook will be pulled outward in position for coupling, and this may be effected by turning the crank $i$ or $i^2$ at either side of the car from the ground. For holding the hooks in coupling positions, the rod $h$ is provided with a ratchet, $k$, near each crank, and a pawl, $l$, Fig. 3, serves to hold the cranks when turned, to keep the hooks open. These pawls and those, $f^3$, for holding the crank $f$ of the hook-elevating rod $e$ are pivoted so as to drop down when released from the ratchets, and thereby allow the train-man on one side of the train to release the pawls which may be engaged on the other side, and to engage said pawls with the ratchets as he may desire from either side of the train, to leave the hook in coupling or uncoupling position, as may be necessary in making up the train or for sliding out one or more cars from the train. The hooks are thus held by the ratchets $k$ and pawls $l$ in position for coupling against the force of the springs $d\,d$, which holds the ratchets in gear by the chains $j\,j$, which pull upon the cranks, and as the hooks come together they open, thus releasing their pull upon the cranks $i\,i^2$, and necessarily releasing the pull upon the ratchet $k$, so that the pawls are released and drop down, thus allowing the springs to fully close the hooks when coupled.

For freight-cars, a vertical rod, $m$, Fig. 7, connects with one of the cranks $i\,i^2$, and, extending to the top of the car, terminates in a hand-hold, $m'$, by which it is pulled up to raise the crank $i^2$ and pull out the hook. This top operating-rod passes through a slot, $n$, in a plate, $n^2$, and is provided with a catch, $n'$, which, when the rod is raised, catches upon the plate $n^2$, serving the same purpose as the ratchet and pawl $k$ and $l$, and holds the rod up and the hook in uncoupling position, so that the engineer can back and leave the uncoupled car on the siding. In making up the train the uncoupling-rod $m$ is released by turning up the crank $i^2$, so as to elevate the rod $m$ sufficient to release its catch $n'$ and allow said rod to fall back, as shown in Figs. 7$^a$ and 7$^b$, to its resting-place in the slot, and its catch $n'$ to pass down through the slot $n$, as in Fig. 7$^b$, and thus the hook A will be pressed by its side spring, $d$, into position for coupling. A similar rod, $m'$, is connected with one of the cranks $f'$ of the crank-rod $f$, for raising and lowering the coupling-hook A from the top of the car, and for holding the hook in coupling position by the catch $n'$. For this purpose the top plate, $n^2$, has two separate slots, $n$, as shown in Fig. 7$^a$, in which both the rods are shown as being held up by the catches $n'$ on the slotted plate, and in the position they occupy in the slots when not raised.

As stated, the butt-joint coupling B may be connected with a pull-and-push spring device, or with a non-cushioned draw-head. When the former is used, the draw-head C forms a sort of box-housing for the cushioned pull-and-push device, which consists of two cup-castings, $p$, secured together by square plates formed with the cups, between and within which a coil-spring, $q$, is placed. These cup-castings are secured together upon the spring, and are fitted between offsets $q^2$ within the cast-iron housing C, which is firmly bolted by a top flange, C', to the longitudinal or other timbers of the car. The top flange, C', has boss projections $r$, through which the securing-bolts pass, and these projections are let into the timbers for giving greater resistance to the pulling and pushing force.

The vertical butt-joint is formed in a head-casting, $s$, having horizontally-projecting ends $s'$ at top and bottom, preferably rounded and grooved, through which the vertical joint-pin $b$ passes, as shown in Fig. 2. This joint-head casting $s$ has a flat back, which fits upon the outer face of the front cup-plate, $p$, within the open front of the box-housing C, so that the pushing force of the coupling is exerted upon the front cup-plate, and is resisted by the spring $q$, which is supported by the rear cup-plate, which in turn is supported against the interior housing offsets or abutments $q^2$.

The vertical joint-head casting $s$ is supported in front of the front cup-plate by two yokes, $t\ t$, formed of wrought-iron rods bent cold over a former and threaded at their ends, as shown in Fig. 12. These yoke-rods $t$ fit within the grooves of the head-casting above and below the joint-coupling B, and pass through holes in the back at the corners of said head-casting and through corresponding holes in the cup-plates $p$, and are secured by nuts $u$, whereby the vertical joint-head and the cup-plates are united together and form a pull-and-push coupling for the coupling-hook, in which the pulling force is exerted upon the rear cup-plate, and is resisted by the spring, which is supported by the front cup-plate, which in turn is supported against the interior housing offset or abutments $q^2$. The securing-nuts for the pulling-yokes are locked by the inner walls of the housing, so that they cannot be unscrewed when the united cup-plates are set within the housing, as shown in Fig. 1.

The double butt-joint coupling B for the coupling-hook may be connected to a fixed joint-head casting, D, or to a draw-head of any suitable construction, as shown in Fig. 8.

Each housing has one or more side lugs, E, which are intended for continuous coupling-rod connections.

It will be understood that when the coupling is applied to passenger-cars the cranked rod $h$ and its connection with the hook are not used, but the hook is operated by the rod connection $g$ in the usual manner, and that when the coupling is used for freight-cars the connection $g$ is not used.

I claim—

1. A twin-hook coupling having the shank part A pivoted, the fixed projection $c'$ extending from said shank part into the throat of the hook $c$, and having its hook end recessed to adapt it to receive the said fixed projection to be locked within the intermatching hooks, substantially as described, for the purpose specified.

2. A twin coupling having the shank of each hook part pivoted by a double flexing joint, substantially as described, for the purpose specified.

3. The combination of a suitable coupling-hook draw-head with a coupling-hook pivoted thereto by joint-pins arranged at right angles to each other, substantially as described, for the purpose specified.

4. A twin-hook coupling having the shank of each hook part pivoted to the draw-head by a horizontal butt-joint pin, $a$, and a vertical butt-joint pin, $b$, in combination with a joint-coupling, B, connecting the hook with the draw-head, substantially as described, for the purpose specified.

5. The combination, in a twin coupling, of the hooks, with their pivot-pins $a\ b$, the joint-coupling B, and the separate joint-head $s$, connecting said joint-coupling with the draw-head, substantially as described.

6. The combination, with the hook A, of the joint-coupling B, the joint-head $s$, the butt-joint pins $a\ b$, the yoke-rods $t\ t$, and the cushioned draw-head $p$, substantially as described, for the purpose specified.

7. The combination, with the hook having its shank part A pivoted by a double flexing joint, substantially as described, of means, substantially such as described, whereby it is adjusted and sustained both in lateral and vertical positions for automatic coupling.

8. The combination, with the hook, pivoted substantially as described, of the cranked rod $h\ i$, the ratchets $k$, the pawls $l$, and the chain $j$, connecting said hook and the crank $i$ of said rod, substantially as described, for the purpose specified.

9. The combination, with the hook, pivoted substantially as described, of the cranked rod $f\ f'$, the ratchets $f^2$, and the pawls $f^3$, and the pivoted rod $e$, connecting the said cranked rod with the hook, and provided with the spring $e^2$, for sustaining said hook upon the pivoted rod, substantially as described, for the purpose specified.

10. The combination, with the coupling-hook, pivoted substantially as described, of the cranked rods $h\ i\ f\ f'$, their ratchets and pawls, and means, substantially such as described, whereby said hook is connected with the cranked rod $i$ and with the cranked rods $f f'$, and sustained in horizontal position for coupling.

11. The combination, with the coupling-hook, pivoted substantially as described, of the cranked rods $h\ i\ f\ f'$, their ratchets and pawls, the chain $j$, the pivoted rod $e$, provided with the hook-sustaining spring $e^2$, and means, substantially such as described, whereby the said cranked rods are connected for operating and adjusting the coupling-hook from the top of the car.

12. The combination, in a car-coupling, of the slotted plate $n^2$, secured to the top of the car, the rods $m$ $m'$, provided each with a catch, $n'$, the cranked rods $h$ $i$ $f$ $f'$, their ratchets and pawls, the chain $j$, the pivoted rod $e$, provided with the hook-sustaining spring $e^2$, and a hook having its shank pivoted by a double joint, all constructed and arranged for coupling and for uncoupling cars from the ground and from the top of the car, substantially as described, for the purpose specified.

13. The combination of the hook A, having the interior recess, $c^4$, the fixed projection $c'$, extending into the throat of the hook, and a pin-hole, $c^2$, passing through said interior recess, with the removable locking-pin $c^3$, substantially as described, for the purpose specified.

In testimony whereof I have hereunto set my hand in the presence of two subscribing witnesses.

W. H. WARD.

Witnesses:
 W. L. S. WILSON,
 P. DEWEES.